United States Patent

Bush

[15] 3,667,306
[45] June 6, 1972

[54] DEVICE FOR PROVIDING CONTROLLED MOVEMENT

[72] Inventor: George L. Bush, Stamford, Conn.
[73] Assignee: The Bunker-Ramo Corporation, Oak Brook, Ill.
[22] Filed: Feb. 16, 1970
[21] Appl. No.: 11,746

[52] U.S. Cl. .................................. 74/125.5, 310/21
[51] Int. Cl. ........................................... F16d 27/10
[58] Field of Search ............. 192/45, 44; 74/573, 574, 125.5; 40/33, 52, 53; 310/20–24

[56] References Cited

UNITED STATES PATENTS

| | | | |
|---|---|---|---|
| 1,322,659 | 11/1919 | Volkers | 310/21 |
| 2,954,491 | 9/1960 | Digirolamo | 310/21 |
| 2,286,419 | 6/1942 | Krenzke | 192/45 |
| 1,838,389 | 12/1931 | Goldberg | 40/52 |
| 2,829,526 | 4/1958 | Riordan et al. | 74/29 |

Primary Examiner—William F. O'Dea
Assistant Examiner—Wesley S. Ratliff, Jr.
Attorney—Frederick M. Arbuckle

[57] ABSTRACT

A device for moving a member by a controlled amount or to a controlled position. An element undergoing a rotary vibrational movement is coupled to rotate a rotatable member when the element vibrates in one direction but not when the element vibrates in the opposite direction, causing a slight incremental advance of the rotatable member in the one direction for each cycle of the vibrating element.

4 Claims, 4 Drawing Figures

PATENTED JUN 6 1972 3,667,306
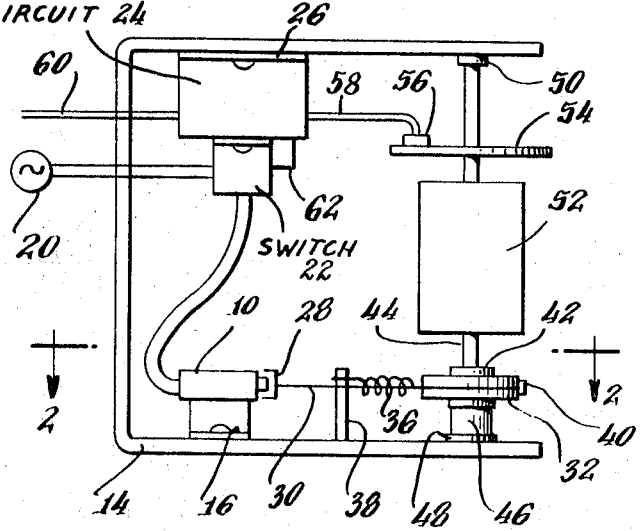
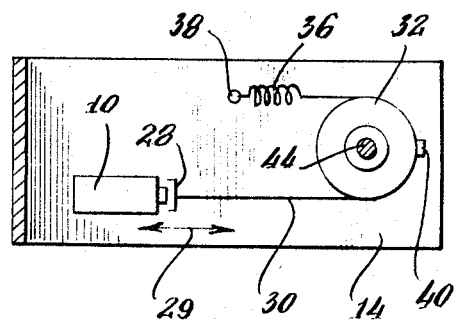
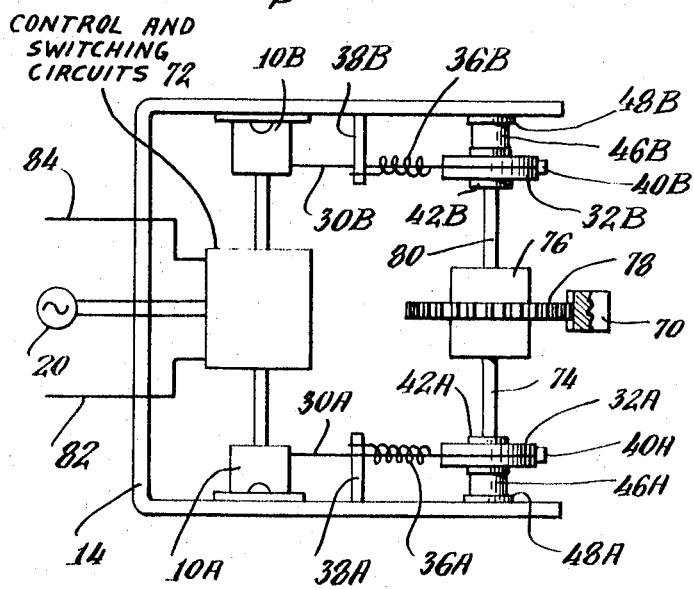
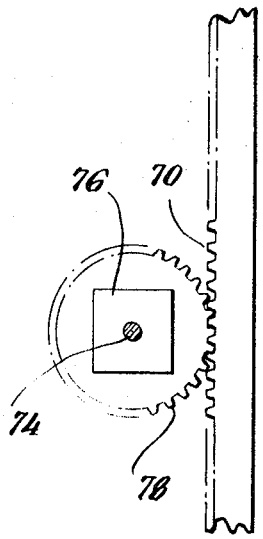
INVENTOR
George L. Bush
BY Ronald J. Kransdorf
ATTORNEY

DEVICE FOR PROVIDING CONTROLLED MOVEMENT

This invention relates to a device for moving a member by a controlled amount, or to a controlled position, and more particularly, to a device for converting a vibrational movement into a controlled movement in a desired direction.

There are numerous applications where it is required to either move a member to a selected physical position, or to impart a predetermined increment of movement to a member. In one such application, a drum containing numerical indicia is mounted on a shaft and, in response to a predetermined input, the shaft is rotated until a selected numeral on the drum is in a display position. In existing devices for performing this function, a train of pulses is utilized to step the drum from one indicia position to the next until either an indication is received that the desired numeral is in a display position, or until the required number of pulses to step the drum to the desired position have been received. With such a drive mechanism, the steps are relatively large. Significant energy is therefore required to overcome the inertia of the drum for each step and significant energy is required to stop the drum after each step. The repeated shocks resulting from starting and stopping the drum cause strain and wear on the components utilized, limiting the useful life of the device and increasing the required maintenance. In this application, a device which would significantly lower, start and stop inertias would therefore permit the use of a smaller, less expensive, drive element, would reduce the power drain of the device, would reduce the size and weight of components in the device because of the lower stresses which it would be called upon to withstand, would increase the useful life of the components, and would reduce maintenance costs.

In other applications it is desired to move a member, either rotationally or linearly, by a very small amount, to a very closely defined position. Heretofore, complicated gear trains and like devices have been utilized in order to obtain such positional control. A need therefore exists for a small, simple, inexpensive device for providing movement in small increments to a finely controlled position.

It is therefore a primary object of this invention to provide an improved movement control mechanism.

A more specific object of this invention is to provide a rotary movement control mechanism which permits relatively large movements to a controlled position with minimum start and stop inertia.

Another object of this invention is to provide a device for moving a member in very small increments to a finely controlled position.

Still another object of this invention is to provide a movement control device of the type indicated which is relatively small, simple, and inexpensive.

In accordance with these objects, this invention provides a device for providing a controlled movement, and, more particularly, a controlled rotary movement, which includes a means for providing a rotary vibrational movement and a means for joining the member undergoing said rotary vibrational movement to a rotatable member in a manner such that the members are free to rotate relative to each other in only one direction. Thus, for each cycle of vibration of the rotary vibrational movement, the rotatable member is incrementally rotated in a selected direction. This incremental rotary motion may be converted into a linear motion through, for example, a rack and pinion mechanism.

In a preferred embodiment of the invention, the rotary vibrational movement is obtained from a means for generating a vibrational mechanical movement which is coupled to a rotatable member by a band secured at one end to the vibrational movement means, and is mounted on the rotatable member in a manner to impart a rotary vibrational movement thereto.

The foregoing and other objects, features and advantages of the invention will be apparent from the following more particular description of preferred embodiments of the invention, as illustrated in the accompanying drawings.

In the drawings:

FIG. 1 is a side view of an illustrative embodiment of the invention.

FIG. 2 is a top view taken along the line 2—2 of FIG. 1.

FIG. 3 is a side view of an alternative embodiment of the invention.

FIG. 4 is a bottom view of a portion of the embodiment shown in FIG. 3.

Referring now to FIG. 1, it is seen that for an illustrative embodiment of the invention, a vibrating relay 10 is secured to a C-shaped housing 14 by a screw 16 or other suitable means. AC excitation from a source 20 is applied to relay 10 through a switch 22. Switch 22 may be any standard electronic or electromechanical device adapted to perform the required function. For simplicity of illustration, switch 22 has merely been shown as a can mounted on a similar can containing a control circuit 24 the function of which will be described later. The can containing circuit 24 is secured to housing 14 by screws 26 or other suitable means.

As relay 10 is energized, relay armature 28 is vibrated in the directions indicated by line 29 (FIG. 2). A band 30 of a flexible, but nonextendable, material is secured at one end to armature 28 and passed around a wheel 32 in a counterclockwise direction as viewed in FIG. 2. Band 30 terminates in a connection to one end of a tension spring 36. The other end of spring 36 is secured to a post 38 mounted on housing 14. Band 30 is secured to wheel 32 by clamp 40.

Wheel 32 is secured to the outer shell of an overrunning clutch 42. Clutch 42 and a second overrunning clutch 46 are mounted on a shaft 44. Rotation of the outer shell of clutch 46 is prevented by securing it to a gimble 48 which is mounted on housing 14. Clutches 42 and 46 may be any of a variety of standard overrunning clutches which are adapted to permit a shaft passing through the clutch to rotate relative to the clutch in one direction but not to rotate relative to the clutch in the other direction. A clutch suitable for use in this invention is shown in U.S. Pat. No. 3,184,020 entitled "Overrunning Clutch and Cage Therefore" issued to Carl F. Benson et al. on May 18, 1965 and assigned to the Torrington Company. For purposes of illustration, it will be assumed that clutch 42 does not permit relative movement between wheel 32 and shaft 44 when wheel 32 is rotated in the counterclockwise direction, as viewed in FIG. 2, but does permit relative movement between these elements when the wheel is rotated in the clockwise direction. Clutch 46 permits shaft 44 to rotate relative to housing 14 in the counterclockwise direction but locks the shaft against rotation in the clockwise direction.

Shaft 44 is mounted for rotation in housing 14 on gimbles 48 and 50 and also has mounted thereon an indicator drum 52 and a code disk 54. Drum 52 may, for example, have a plurality of numerals imprinted on its periphery and may be utilized as an indicator element of a display device. Code disk 54 may be any one of a variety of devices having, for example, concentric rings with selectively conductive areas, magnetic areas, or optically clear and opaque areas. A suitable transducer 56 is provided to read the coding on disk 52 and to provide on lines 58 a coded electrical indication of the present rotational position of shaft 44 (and thus also of drum 52). The position indicated on lines 58 is compared in control circuit 26 with an indication of the desired rotational position of shaft 44 applied to the control circuit through lines 60. The circuit 24 controls switch 22 through signals on line 62.

In operation, signals are initially applied through lines 60 to control circuit 24 indicating a desired character which is to be displayed on drum 52, and thus a desired rotational position of shaft 44. If this position is different from the present position of the shaft, the signals appearing on lines 58 and 60 are different. Control circuit 24 detects this mismatch and generates an output on line 62 which closes switch 22 permitting an AC signal from source 20 to be applied to energize vibrating relay 10. For each cycle of the AC source, band 30 is pulled in a clockwise direction, as seen in FIG. 2, by the action of the relay on armature 28. The band is then pulled counterclockwise back to its original position by the return force of spring 36. During the initial clockwise movement of wheel 32, the wheel and shaft 44 are decoupled by clutch 42. Shaft 44 is locked against movement in this direction by clutch 46. However, since clutch 42 locks wheel 32 to shaft 44 when wheel 32 is rotated in the counterclockwise direction, the counterclockwise return movement of wheel 32 results in a corresponding movement of shaft 44 in the counterclockwise direction. It should be emphasized that by controlling the extent of movement of armature 28 and the radius of wheel 42 the rotational movement of shaft 44 for each cycle of the relay may be controlled to a very small amount. Since drum 52 and indicator disk 54 are secured to shaft 44, their rotational position is also advanced. Thus, for each cycle of vibration of relay 10, shaft 44 is advanced in the counterclockwise direction by a predetermined small increment. Since these increments are very small, and occur at a relatively high rate of speed, for example 120 cycles per second, the start and stop inertia for each increment is virtually nil. Thus, almost all of the power applied to the device is converted into motion.

While the advancing of shaft 44 could occur on either the energizing of the relay or on the return as shown, it has been found that the energy in the drive is used more efficiently when advancing the shaft on the return. The reason for this is that the energy in the relay is not utilized to overcome the inertia of the driven members but used solely to stretch the spring. The force required to stretch the spring is least when the armature is furthest from the core and the pull of the core is weakest, and increases as the pull of the core increases. Similarly, the maximum force required to move the shaft and drum is on start-up when the force of the spring is greatest. If the relay were also required to supply the start-up force for the shaft and drum when its pull is weakest, a more powerful relay could be required.

Shaft 44 continues to increment until code wheel 52 is advanced to a position where the character or position detected by transducer 56 is the same as that appearing on line 60. At this time, a signal appears on line 62 opening switch 22 to terminate the vibration of relay 10. This effectively terminates the incrementing of shaft 44. It is thus apparent that a device has been provided which can move a member to a precise rotational position in small incremental steps. While, for the display application indicated above, a high degree of precision is not required, in other applications positioning to within a small fraction of a degree may be provided. The precision of the positioning is to some extent limited by the smallest unit of measure which can be provided on coding disk 54.

While the embodiment of the invention shown in FIGS. 1 and 2 is useful for many applications, it is limited in that it provides rotation in only a single direction and that in it provides for only rotary movement. FIG. 3 shows an embodiment of the invention which is capable of moving a linear member 70 in either direction. Common elements in FIGS. 1 and 3 are similarly numbered.

Referring to FIG. 3, it is seen that the output from AC signal source 20 is applied to a control and switching circuit 72. When it is desired to move rack 70 downward, as viewed in FIG. 4, a switch in circuit 72 is closed to apply the AC signal from source 20 to a vibrating relay 10A which is the same as the relay 10 of FIG. 1. When it is desired to move rack 70 in the opposite direction (i.e., upward as viewed in FIG. 4) a different switch in circuit 72 is closed permitting the AC signal from source 20 to be applied to a vibrating relay 10B which again is of the type shown in FIG. 1.

A band 30A fixed at one end to relay 10A is passed around a wheel 32A in the same direction as shown in FIG. 2 and terminated in an attachment to one end of a spring 36A. The spring 36A is secured at its other end to a post 38A mounted on housing 14. Wheel 32A is secured to the outer casing of an overrunning clutch 42A having a shaft 74 passing through it. Shaft 74 also passes through a second overrunning clutch 46A and terminates in a gimble 48A mounted on housing 14. Clutch 46A is secured to gimble 48A and functions in the same manner as clutch 48 to permit rotation of shaft 74 only in the counterclockwise direction. Clutch 42A causes shaft 72 to rotate with wheel 32A only when wheel 32A is rotating in the counterclockwise direction.

Shaft 74 terminates at its other end in differential gear box 76. Gear box 76 is effective to cause gear 78 to rotate in a counterclockwise direction when shaft 74 rotates in a counterclockwise direction. Box 76, however, permits slippage between gear 78 and shaft 80 at this time, shaft 80 being held against rotation by the action of clutch 46B. As will be seen shortly, box 76 also permits slippage between gear 78 and shaft 74 when shaft 80 is being utilized to drive gear 78 in the clockwise direction. As may be best seen in FIG. 4, gear 78 is utilized as a pinion to drive rack 70. Thus, when pinion gear 78 is being driven in a counterclockwise direction, rack 70 is being moved upward as viewed in FIG. 4.

Similarly, a band 30B secured at one end to relay 10B is passed around wheel 32B in the clockwise direction as viewed from the bottom (i.e. in the opposite direction from the direction in which band 30A is passed around wheel 32A) and terminated in a connection to one end of spring 36B. Spring 36B is connected at its other end to pin 38B mounted on housing 14. Wheel 32B is connected to the housing of overrunning clutch 42B which clutch is passed through by shaft 80. Counterclockwise movement of shaft 80 is prevented by overrunning clutch 46B which is secured to gimble 48B mounted on housing 14. Shaft 80 also terminates at its other end in differential gear box 76.

In operation, it will be assumed that the device shown in FIG. 3 is an incremental positioner wherein a signal on line 82 indicates a desired upward movement of rack 70 while a signal on line 84 indicates a desired downward movement of the rack. Thus, a signal on line 82 may, for example, be a pulse of duration equal to the number of cycles of source 20 which are required to effect a desired increment of movement of rack 70 in the upward direction. In the alternative, the signal on line 82 may represent the count of the number of AC cycles required for such an increment of movement with this count being stored in control circuit 72 and being decremented once for each cycle of source 20. When the count equals zero the switch passing the AC signal to relay 10A is opened. Since the particular control circuit utilized does not form part of the present invention, the above indicated controls are mentioned merely for purposes of illustration and any suitable method of control may be utilized.

When relay 10A is energized, band 30A is cyclically pulled in the clockwise direction by relay 10A and then restored by being pulled in a counterclockwise direction by the action of spring 36A. Clutches 42A and 46A function, as described previously for the embodiment of the invention shown in FIG. 1, to permit only a small counterclockwise increment of motion to shaft 74 for each cycle of relay 10A. This increment is applied through differential gear box 76 to pinion 78 causing rack 70 to be moved upward by a similar small amount.

Rack 70 is moved downward as a result of clockwise motion of pinion 78 caused by shaft 80 as a result of the energization of relay 10B. Except for direction, the manner in which this rotation is caused is identical to that described above and further description is not believed necessary.

While in the preferred embodiments of the invention described above the vibrational movement has been obtained from a relay, it is apparent that even finer increments of motion could be obtained by utilizing some other vibrating element as, for example, a piezoelectric crystal. The control circuits mentioned above, as previously indicated, are merely illustrative with the particular control circuitry employed depending on the specific application of the device.

Thus, while the invention has been particularly shown and described with reference to preferred embodiments thereof, it will be understood by those skilled in the art that the foregoing and other changes in form and details may be made therein, without departing from the spirit and scope of the invention.

What is claimed is:

1. A device for moving a first rotatable member from a first position to a second position in a plurality of small incremental steps comprising:

an electrically energized vibrator;

a second rotatable member;

a band secured at one end to said vibrator and engaging said second rotatable member in a manner such as to impart a rotary vibrational movement thereto in response to the vibration of said vibrator, said movement being, for each vibration cycle, a small fraction of a revolution of said member;

means for securing said first and second rotating members together when said second member moves in one direction during a vibration cycle while decoupling said members when said second member moves in the opposite direction during a vibration cycle;

whereby said first rotatable member is incrementally advanced in said one direction for each vibration cycle of said second rotatable member;

a third rotatable member adapted to rotate in either said one direction or said opposite direction; and means for coupling said first and third rotating members in a manner such that said members rotate together when said third member is being driven in said one direction but are free to rotate relative to each other when said third member is driven in said other direction.

2. A device of the type described in claim 1 including means for driving said third member in said other direction, said means including an electrically energized vibrator.

3. A device for moving a first rotatable member from a first position to a second position in a plurality of small incremental steps comprising:

an electrically energized vibrating relay;

a second rotatable member;

a band secured at one end to said vibrating relay and at the other end to a resilient means, said band engaging said second rotatable member in a manner such as to impart a rotary vibrational movement thereto in response to the vibration of said relay, said movement being, for each vibration cycle, a small fraction of a revolution of said member, said resilient means being adapted to restore the second rotatable member to its initial position during each vibration cycle; and means for securing said first and second rotating members together when said second member moves in one direction during a vibration cycle while decoupling said members when said second member moves in the opposite direction during a vibration cycle;

4. A device of the type described in claim 3 wherein said one direction is the direction in which said rotatable members are rotated by said resilient means and said opposite direction is the direction said second rotatable member is driven by said relay.

* * * * *